Nov. 28, 1967 G. J. CULLER 3,355,714

ON-LINE COMPUTING SYSTEM FOR PROCESSING MATHEMATICAL FUNCTIONS

Filed Oct. 21, 1963 3 Sheets-Sheet 1

GLEN J. CULLER

INVENTOR

BY Arthur Freilich

ATTORNEY

Nov. 28, 1967 G. J. CULLER 3,355,714

ON-LINE COMPUTING SYSTEM FOR PROCESSING MATHEMATICAL FUNCTIONS

Filed Oct. 21, 1963 3 Sheets-Sheet 2

INVENTOR
GLEN J. CULLER
BY Arthur Frerich
ATTORNEY

GLEN J. CULLER
INVENTOR
BY Arthur Freilich
ATTORNEY

United States Patent Office 3,355,714
Patented Nov. 28, 1967

3,355,714

ON-LINE COMPUTING SYSTEM FOR PROCESSING MATHEMATICAL FUNCTIONS

Glen J. Culler, Santa Barbara, Calif., assignor, by mesne assignments, to The Bunker-Ramo Corporation, Stamford, Conn., a corporation of Delaware Filed Oct. 21, 1963, Ser. No. 317,598
23 Claims. (Cl. 340—172.5)

This invention relates generally to computer systems and more particularly to a system for effecting the solution of problems of a nature heretofore not effectively solvable by known digital computer techniques.

Despite the impressive achievements in computer hardware and programming techniques in recent years, and the promise of more to come (nanosecond logic, billion bit memories, new "languages," et al.) it has become apparent that the most significant advances presently realizable in computer technology are to be derived from new approaches in the use, organization, and logical structure of computers. One line of research being presently directed toward this end attempts to impart to the computer certain activities generally associated with human beings. These attempts have resulted in enlightening studies being made of learning machines, adaptive machines, etc.

A significantly different line of research has been directed to methods and apparatus for improving man-machine communication so that the computer can effectively assist the man in those jobs (requiring intuition, judgment, evaluation) for which man is best suited. Although no universally accepted nomenclature for this latter type of effort seems to exist, it is sometimes characterized as a means of getting a man "on-line" with a computer.

The development of on-line computation is significant because of the ineffectiveness of off-line computation in solving certain types of problems. More particularly, significant, if not intolerable, problems have been commonly encountered in attempting to use an off-line computer system to solve mathematical research type problems whose structure is for the most part unknown and frequently surprising. These problems result from the fact that it is notoriously difficult to develop a satisfactory computer program if one does not understand, a priori, the general character of the solution. In fact, information about the general character of the solution is often what a research scientist really wants, as distinguished from the quantitative details of the solution. Although it is possible in principle to perform experimental mathematics with off-line computing systems by starting with some promising method of solution together with the associated program therefore and modifying either the method or the program in the light of the initial results obtained, such attempts have not provided satisfactory results due to the time lapse encountered between the selection of a new method, or the modification of the old one, and the subsequent return of information from the computer. This time lapse in off-line systems is in most cases so great as to make this approach practically infeasible.

In other words, the basis of the ineffectiveness of off-line systems lies in the poor communication between the "user" (e.g. a scientist or mathematician who originates a problem and knows most about it) and the computer. Poor communication results both from economic considerations and the inherent difficulty encountered by a user in attempting to impart to a programmer the detailed and specialized knowledge he has acquired about a particular problem area after having worked in it for some time.

In view of the recognized ineffectiveness of off-line computer systems for the solution of certain types of problems, it is an object of the present invention to provide an on-line computer system including means which permit a user to communicate with a computer in a manner enabling the user to manually direct operations of the computer and to immediately be made aware of results derived from such operations so as to then enable the user to direct further operations in the light of the derived results.

It is a more particular object of the present invention to provide an on-line computer system particularly adapted to enable a user to experiment mathematically and thereby solve problems of a nature whose method of solution is not apparent, a priori, to the user.

Of course, in order to cause a computer to perform desired operations, appropriate sets of instructions or subroutines must be supplied to the computer. Oftentimes, in the solution of mathematical problems, not only is the overall method of solution not apparent, a priori, to the user but in addition certain operations which it subsequently becomes necessary to repeatedly perform are likewise not apparent. In off-line systems and heretofore known on-line systems, such occurrences would delay the user's investigation of a problem either because of the time lapse required for the user to impart the necessary knowledge to a programmer who in turn would construct an appropriate computer subroutine to perform such operations or alternatively, because the user would repeatedly initiate the same series of elemental subroutines, to form the desired operational subroutine.

In view of this, it is a further object of the present invention to provide an on-line computer system including means for enabling the user to rapidly and manually construct new subroutines and thereby avoid the delays inherent in heretofore known systems.

Moreover, heretofore known digital computer systems utilized for scientific applications are not well adapted to solve mathematical type research problems because they are generally word oriented while the problems are generally function oriented. More particularly, in conventional systems, operations are performed on individual data words, the same operation always being performed on all the bits of a data word. Each data word generally represents a numerical quantity whose precision is determined by the number of bits in a word or word length. In order to efficiently solve problems which are essentially function oriented, functions instead of individual numerical quantities should be represented and operations should be performed on functions rather than on individual numerical quantities. For example, consider several functions each represented by a list of function point coordinates. In accordance with conventional processing techniques, each point coordinate would be fully processed in accordance with a pre-defined program prior to the processing of a subsequent point coordinate.

In view of this, it is a still further object of the present invention to provide a computer system particularly adapted to operate on mathematical functions. Such a system performs each operation on the entire list of function points coordinates prior to proceeding with subsequent operations. This procedure is to be distinguished from conventional scientific processing in which, as noted, each point coordinate is fully processed, through *perhaps* several operations, prior to the processing of a subsequent point.

Briefly, the invention herein is embodied in a system including computational and display apparatus and is based on the recognition that certain types of mathematical problems which cannot be efficiently solved by conventional digital computer equipment can be solved by providing a user with manual means for directing the operations of the computer together with means providing intermediate computational results, preferably in the form of graphical displays, in view of which the user can subsequently decide as to how to direct the course of further computer operations.

In the preferred embodiment of the on-line digital computer system disclosed herein, an unusually direct coupling between a user and a computer is provided. The system finds significant utility in providing assistance in the solution of problems whose structure is partially unknown and which therefore require the development of new methods of attack, and hence an amount of experimentation not feasible in standard computer systems. The system described herein couples the user to the computer so as to permit the effective employment of the user's intuition and of his detailed understanding of techniques appropriate to his special field.

The system is essentially comprised of a digital computer coupled to a large digital storage memory, together with a user's console including a keyboard input device and a display device suitable for providing graphical displays of functions. There are several significant features of the system from which stem the capability of permitting a user to communicate with a computer rapidly and essentially in the user's language to thereby facilitate the solution of the type of problems mentioned. A first of these features is that the system is organized in a manner which permits operands comprising mathematical functions (e.g. the coordinates of a plurality of function points) to be processed similarly to the manner in which operands comprising individual numbers are processed in conventional computer systems. A second of these features comprises the provision of keyboard control means and a diplay device which permits the user to directly control operations performed by the computer and in addition to view the results of such operations immediately after they are performed. A third of these features is the provision of means which allows the user to construct higher level computer subroutines at the console keyboard from lower level subroutines. After being constructed and stored, each subroutine can thereafter be initiated by the user in response to the actuation of a single one of the keys. Lower level subroutines refer to subroutines controlling basic computer operations and higher level subroutines of course refer to subroutines controlling more complex operations.

These features together with various other aspects of the system permit the user to investigate a problem in a language which much more closely duplicates that of his own field of interest than computer languages currently available to scientists. The control and display features provide the feedback necessary for the desired man-machine interaction and also allow a continuing check of both programs and computations. The ability of the user to effectively construct computer subroutines allows the user to construct not only his own mathematical system but a system effectively in his own language.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
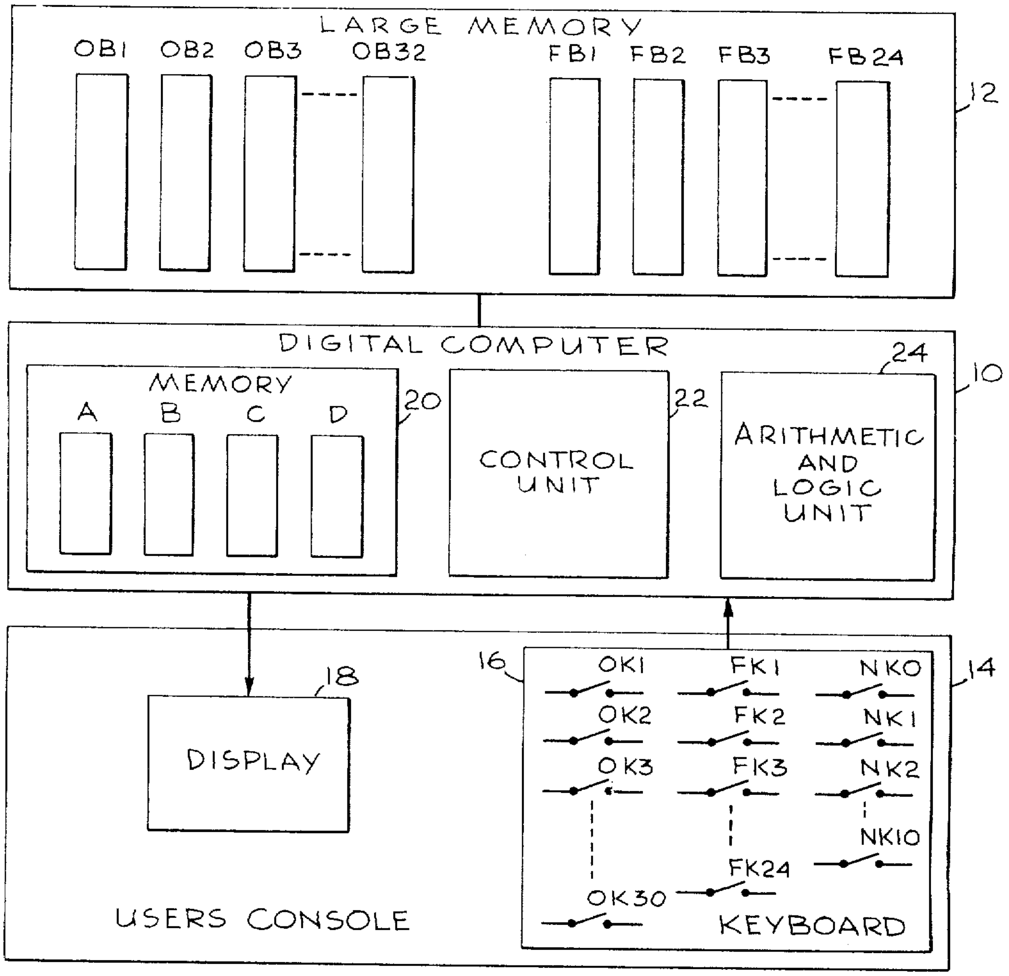
FIGURE 1 is a block diagram of a computer system constructed in accordance with the present invention and including a digital computer, a user's console, and a large memory.

Attention is now called to FIG. 1 of the drawings which illustrates in block diagrammatic form an on-line computer system comprising the preferred embodiment of the present invention. The system includes a digital computer 10, a large memory 12, which can for example be of the magnetic drum of disc type, and a user's console 14 including a keyboard 16 and a cathode ray tube display device 18.

The keys of the keyboard 16 are divided into three groups. The first keyboard group includes a plurality (arbitrarily, 24) of function keys respectively designated as FK1–FK24. A second keyboard group includes a plurality (arbitrarily, 30) of operator keys respectively designated OK1–OK30. A third keyboard group includes 11 numeric keys respectively designated NK0–NK10, the first nine of which are used to respectively represent each of the decimal digits and the last two of which are used to indicate the sign (i.e. + or −) of a number.

The large memory 12 includes first and second portions, each portion including a plurality of memory blocks. The first portion includes a plurality (arbitrarily 32) of overlay blocks respectively designated as OB1–OB32. Each of the overlay blocks includes a plurality of memory locations, each location being capable of storing a subroutine, each such subroutine being comprised of a series of computer instructions. The entire contents of each overlay block will for convenience sake sometimes be referred to as an overlay; for example, overlay block OB4 stores overlay 4.

The second portion of the large memory 12 includes a plurality of function blocks respectively designated as FB1–FB24. Each of the function blocks is capable of storing a mathematical function as represented by a list of the abscissa and ordinate values of a plurality of coordinates of the mathematical function. For purposes herein, the generally valid assumption that any such function can be reasonably accurately represented by one hundred intervals or in other words, 101 coordinates will be made. Consequently, each mathematical function stored in the large memory 12 will be represented by a list including 202 numbers, each number representing the value of a different ordinate or abscissa. Each function block can be considered, in terms of conventional digital memory structures, as being comprised of a plurality of different word locations and each of the different abscissa and ordinate values can be considered as being stored in a different one of those locations. In addition to the 202 abscissa and ordinate values stored in each of the function blocks, a pair of scale factors $s_x$ and $s_y$ are also stored in each function block.

The digital computer 10 includes a memory 20, a control unit 22, and an arithmetic and logic unit 24. The memory 20 includes four registers respectively designated as A, B, C, and D. Registers A and B, as will be seen more clearly below, are utilized to store the contents of selected overlay blocks transferred thereto from the large memory 12. On the other hand, registers C and D are utilized to store the contents of selected function blocks transferred thereto from the large memory 12.

Each of the plurality of operator keys in the keyboard 16 corresponds to a different location in the A register. In response to the actuation of one of the operator keys, the contents of the corresponding location in the A register are transferred to the control unit 22. By transferring the contents of a selected one of the overlay blocks from the large memory 12 to the A register, and by thereafter actuating an operator key, any subroutine stored in the overlay blocks of the large memory 12 can be transferred to the control unit 22. In response to the transfer of a subroutine to the control unit 22, different operations, as identified by the particular transferred subroutine, are performed. These operations can be mathematical (e.g., arithmetic) in nature or can comprise other logical or transfer operations. In any event, operations are performed with respect to functions stored in the C and D registers. Particular functions can be identified by actuation of desired function keys, each function key corresponding to a different one of the function blocks in the large memory 12. The numeric keys have many uses; for example, they are utilized in conjunction with the operator keys in order to identify a particular overlay block or in conjunction with both the operator and function keys for modifying values in the function blocks.

As a preliminary and exceedingly simple example offered for the purpose of lending substance to what has been said thus far, assume that a user actuates key LK1 and in addition actuates key NK7. Key OK1 comprises an "overlay in" key which thereby causes the contents of overlay block 7 to be transferred to the A register. Let it then be assumed that the user actuates key OK5. As a consequence, the subroutine stored in location 5 of the overlay 7 will be transferred to the control unit 22. Assume that this is a "load" subroutine and thereby sets up appropriate logical gating to transfer a function block, e.g. function block 2 in response to the actuation of key FK2, to register C. Subsequently, arithmetic or transfer operations can be performed on the function stored in register C.

Now in order to further logically develop an understanding of the preferred embodiment, assume initially, for the sake of simplicity, that only one overlay block exists. Also assume that although several function blocks exist, each stored function is represented by 202 numbers, as previously pointed out, all of which lie between $-1$ and $+1$ and comprise mantissas. Each function carries two scale factors; namely $s_x$ for abscissa values and $s_y$ for ordinate values. Each actual ordinate function value is the product of the corresponding mantissa $Y_n$, where $1 \leq n \leq 101$ and the common scale factor $2^{s_y}$. Similarly, each actual abscissa value is the product of the corresponding mantissa $K_n$ where $1 \leq n \leq 101$ and the common scale factor $2^{s_x}$. Further, for the sake of facilitating an understanding of the invention, the initial portion of the following discussion will be directed to a system user and subsequently the details of a hardware implementation will be introduced.

It is further assumed that a set of basic subroutines, each subroutine being comprised of a plurality of instructions to which the control unit 22 of the digital computer 10 is responsive, is stored in the locations of the one overlay block assumed to exist. Each of these basic subroutines is transferred from a location in the A register to the control unit 22 in response to the actuation of a different one of the operator keys on the keyboard 16. The operations performed by the computer 10 in response to each of several basic subroutines will now be considered.

The LOAD and STORE subroutines respectively transfer the contents of any selected function block from the large memory 12 into the D register or conversely store the contents of the D register into any selected function block. For example, actuation of the operator key corresponding to the LOAD subroutine, and subsequent actuation of a function key, e.g. FK7 (these two successive key actuations being hereafter represented by a shorthand notation as LOAD FK7), transfers the function stored in function block FB7 into the D register. Similarly, STORE FK3 transfers whatever function is stored in the D register to function block FB3 in the large memory 12. In both cases, the information contents being transferred replaces whatever information was previously stored. That is, the transfer of the function from the D register to function block FB3 caused whatever function was previously stored in function block FB3, if any, to be lost.

A J−GEN subroutine creates the identity function, $y=x$, $(-1 \leq x \leq +1)$ of whatever function is in the D register. Each of four arithmetic subroutines, +, −, ., ÷, causes the computer 10 to carry out the indicated arithmetic operations on the ordinates of two designated functions, assuming the abscissa values to be the same. For example, LOAD FK3+FK3 causes the function in function block FB3 to be transferred into the D register and the function in function block FB7 to be transferred into the C register. Subsequently, the Y coordinates or ordinate values of the C and D registers, with differences, if any, in the scale factors $s_y$, properly taken into account, are added with the sum being stored in the appropriate ordinate positions of the D register. The abscissa values in the D register are left unchanged.

If the user desires the resulting function in the D register to be stored in, e.g. function block FB8 of the large memory 12, he actuates the operator key which transfers the STORE subroutine to the control unit 22 and thereafter actuates key FK8 on the keyboard 16. Alternatively, the user can continue with a series of arithmetic operations, all of which follow the same pattern. That is, once the operator key transferring the arithmetic+subroutine to the control unit 22 has been actuated, the user can add as many functions as desired by simply actuating the corresponding function keys without requiring that the appropriate operator key be again actuated.

Individual numbers can be entered into the computer in a variety of ways. Since constant functions are sometimes required however, it is convenient to use constant functions to also represent constant numbers. The procedure would be performed by the user by initially actuating the operator key associated with the LOAD subroutine and then actuating the appropriate numeric keys to enter the constant (note that when a function key is actuated after the LOAD operator key, the function contents of one of the function blocks is loaded into the D register but where numeric keys are actuated after the LOAD operator key, the number represented by the actuated numeric keys is entered into the D register). For example, the constant +11.56 can be entered by actuating the numeric keys NK10, NK1 twice, NK5, and NK6 in sequence. Since it has already been pointed out that all numbers are considered as mantissas between ±1, a desired multiplication factor has to be entered also. This multiplication factor is for convenience represented by an exponent of ten. Therefore, after the numeric key NK6 has been actuated, the plus numeric key NK10 is actuated followed by the actuation of numeric keys NK0 and NK2. A constant function whose value is equal to 11.56 is thereby entered into the D register. The 101 abscissa values in the D register are, as usual, equally incrementally spaced between −1 and +1. The ordinate values are all equal to the desired constant 11.56. Of course, this constant function in the D register can thereafter be transferred to a selected one of the function blocks in the large memory 12.

The DISPLAY subroutine causes a function to be graphically represented by the display device 18. DISPLAY FK3 for example causes the function stored in function block FB3 to be displayed on the cathode ray tube of display device 18. The 101 ordinate values can be displayed across the face of the cathode ray tube and, if desired, adjacent points can be connected by a straight line segment. Since, of course, only the mantissa values of a function are displayed by the cathode ray tube, it is sometimes desirable for the user to be able to check the scale of the function. Consequently, a DISPLAY SCALE subroutine can be initiated in response to actuation of one of the operator keys, which causes the ordinate scale factor $s_y$ stored in the D register to be displayed. From what has been said thus far, it should be appreciated that the apparatus provides a user with a capability of performing certain arithmetic and algebraic operations on functions and examining the results graphically whenever desired.

The essential elements of calculus are provided by the $\Delta$ and $\Sigma$ subroutines. In response to the $\Delta$ subroutine, the control unit 22 causes the differences between adjacent ordinate values in the D register to be derived with the differences replacing the ordinate values formerly in the D register. For example, $(y_n - y_{n-1})$ is determined and caused to replace $y_n$, where $2 \leq n \leq 101$. In response to the $\Delta$ subroutine, a cumulative sum of the ordinate values in the D register is taken and the result is left in the D register (i.e. 0 replaces $y_1$ and $$\sum_{k=1}^{n-1} y_k$$

replaces $y_n$, $2 \leq n \leq 101$). Utilization of the $\Delta$ and $\Sigma$ subroutines, each of which can be selectively transferred to the control unit 22 by actuation of a different one of the operator keys, permits approximations of any desired accuracy of the derivatives or integrals of function to be obtained.

From the foregoing, the nature of the system, at least from the user's standpoint, should be clear. That is, it should be understood that an effective, and potentially powerful hand computer and plotting machine have effectively been provided which permits any desired function to be readily created in the system (using power series, asymptotic series, etc.) and which in addition permits all of the operations of classical analysis to be performed upon such functions. As an example, suppose that a user desires the sine of some function, F, which function has been entered into the D register and suppose further that the function is sufficiently small so that the first two terms of a power series suffice, i.e.

$$\text{Sin } F = F - \frac{F^3}{6} \quad (1)$$

The user can obtain the desired result by actuating keys on the keyboard 16 in the sequential manner defined by the following shorthand notation.

STORE F.F F STORE G
LOAD−.166667.G+F (2)

If function, F, was initially in the D register, then sin F, to the accuracy of Equation 1, will now exist there. In precisely similar fashion, one could obtain a representation of the sine function to any desired number of terms of the power series. It should be apparent however that if the system is to in fact readily assist a user in problem analysis, it is not desirable to force the user to repeatedly perform the laborious task of actuating all of the keys required by Example 2, each time the sine of a function is desired. Moreover, it should be clear that if the sine is desired to a greater accuracy than is expressed by Equation 1, a considerably greater number of key actuations would be required. It is at this point that the reader is requested to disregard the assumption initially made that the system be restricted to containing only one overlay block. As noted, when the reader was requested to make that assumption, it was only for the purpose of facilitating a preliminary understanding of the system.

In order to relieve the user of the laborious task of repeatedly going through the same sequence of key actuations, a very significant feature is incorporated in the system which effectively permits the system to "remember" and suitably record a sequence of key actuations such as that given in Example 2. In addition, such a record of a sequence of key actuations is effectively attached to a previously blank operator key which when actuated initiates the recorded sequence of key actuations. For example, the user can select a blank operator key and label it the SINE key. Then he can initiate a PROGRAM subroutine, which is one of the originally stored basic subroutines, by actuating the PROGRAM operator key associated therewith. Then he actuates the operator key he has labelled as the SINE key. Then, he manually actuates in sequence the keys listed in Example 2 and finally actuates the PROGRAM key again. As a result, the system goes through what may be considered a "dry run" and executes the operations defined by Example 2 in precisely the same fashion as if the user had not pushed the PROGRAM key. The user can examine the result of this dry run immediately by causing the result to be displayed by display device 18. In addition to proceeding through this dry run however, the system constructs a record of the sequence of key actuations (such a record being hereafter called a user constructed subroutine) and associates it with the SINE operator key. Consequently, at any time thereafter the user actuates the SINE operator key, the system will proceed through the sequence of operations defined by Example 2. This technique permitting the user to construct subroutines can be extended so that user constructed subroutines need not be composed only of basic subroutines but in addition can be composed of other user constructed subroutines. In this way, the user can create his own subroutines, of arbitrary complexity, and pyramid these to achieve whatever computing capability he desires. Needless to mention however, as a result the system execution times can vary considerably in response to actuation of different ones of the operator keys. That is, the execution of an exceedingly complex subroutine in response to the actuation of one of the operator keys will of course take considerably longer than the execution of an exceedingly simple subroutine initiated in response to actuation of another one of the operator keys.

Because of the great assistance which can be lent to a user by permitting him to construct his own subroutines, it is undesirable to limit the maximum number of subroutines in the system to the maximum number of operator keys which can be practically provided on a user's console. In order to extend the number of such subroutines, both user constructed and basic, available to the user, the plurality of previously mentioned overlay blocks is employed. Each overlay block stored in the large memory 12 includes a plurality (arbitrarily 30) of locations, each of which is capable of storing a subroutine. The contents of each overlay block can be selectively transferred to the A register by appropriate actuation of the operator and numeric keys. More particularly, one subroutine which is common to the contents of every overlay block is the OVERLAY IN subroutine. Assuming that this subroutine is stored in location 1 in each of the overlay blocks, actuation of the operator key OK1 followed by the specification of an overlay block number by actuation of the numeric keys, causes the contents of the specified overlay block to be transferred to the A register. Thereafter, actuation of each of the operator keys initiates a subroutine as determined by the contents of the corresponding location in the A register. For example, actuation of the operator key OK3 when the contents of overlay block 1 has been transferred to the A register will initiate a different subroutine, perhaps, than when the contents of overlay block 3 have been transferred to the A register. It is however pointed out that inasmuch as the contents of one overlay block can be transferred to the A register and then returned to another overlay block, it is in actuality the particular set of subroutines which is in the A register that determines the operations performed in response to the actuation of an operator key rather than the overlay block in large memory 12 from which the contents were transferred. However, for sake of simplicity herein, it is assumed that the contents of each overlay block are returned to the same overlay block from which they were originally obtained. Therefore, different sets of subroutines are considered as different overlays and this nomenclature will sometimes be employed herein. That is, when overlay 3 is for example mentioned, it will be understood that this refers to the set of subroutines transferred to and from overlay block 3.

In addition to the OVERLAY IN subroutine which is common to all of the overlays, it is desirable to make the following subroutines also common to all of the overlays: PROGRAM, REPEAT, OVERLAY OUT, DISPLAY OVERLAY NUMBER, INSERT, and DO. The functions performed by each of these subroutines will be considered below.

In Example 2 above, it was assumed that only one overlay existed. By including a plurality of overlays in the system, the sequence of key actuations set forth in Example 2 has to be modified so that the user in addition to actuating a particular key, has to indicate the overlay to which the particular key actuation should be referred. That is, since actuation of one of the operator keys initiates the transfer of the subroutine contents of a location from the A register to the control unit 22, and since any one of the overlays can be selectively transferred into the A register, in order to initiate a particularly subroutine, as for example in location 3 of overlay 12, it is initially necessary for the operator to transfer overlay 12 into the A register. The transfer is accomplished by actuating the OVERLAY IN key, which it will pe recalled is common to all of the overlays, and thereafter identifying a particular overlay by actuation of the appropriate numeric keys. Thereafter, the user can construct a subroutine and associate it with a particular location in the selected overlay by actuating the PROGRAM key, which is also common to all of the overlays, and then actuating the particular blank operator key (that is blank at least with respect to the overlay in the A register) and thereafter proceeding through the sequence of key actuations defined by Example 2.

Although it should be apparent that the total number of function blocks can be pyramided by the same technique utilized to increase the overlay repertoire, the disclosed preferred embodiment of the invention will, for the sake of clarity, be restricted to the utilization of twenty-four function blocks.

Figure 4:
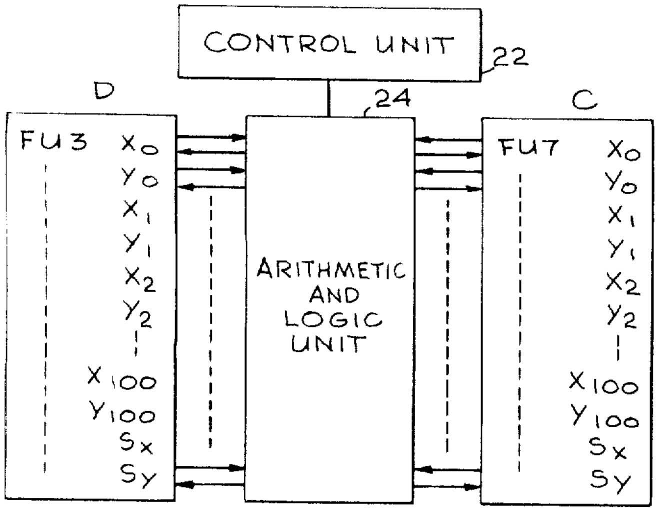
FIG. 4 is a block diagram illustrating generally how functions stored in the C and D registers are operated upon.

Prior to proceeding with a more detailed explanation of the system from a user's standpoint which explanation will make reference to a typical, extensive, and practical set of basic subroutines and illustrate the manner in which the keys of the console can be actuated to analyze a typical research problem, consideration will be given to a hardware implementation illustrated in FIGS. 2 through 4 for performing the heretofore referred to tasks. The illustrated implementation will not delve into the details of the performance of logical and arithmetic operations inasmuch as the mechanization of such operations is well known in the digital computer art and is readily taught in a number of textbooks. The discussion herein will instead extend merely to the application of subroutines to the computer control unit 22, it being understood that the computer control unit 22 is responsive to said subroutines for providing gating signals for effecting specified transfers and for controlling the arithmetic and logic unit 24 for performing specified arithmetic operations. It is of course recognized that these transfers and arithmetic operations can be performed in many different ways while still remaining within the teachings of the present invention. For example, it is inconsequential as far as the invention is concerned as to the particular arithmetic employed. That is, the teachings of the invention are just as effective if the arithmetic is binary or decimal or if the digits of the abscissa and ordinate values of the functions are handled serially or in parallel. Moreover, no details of the display device 18 have been illustrated for such devices are known in the prior art. Essentially they can operate to display a function by causing analog cathode ray tube deflection voltages to be developed from the digital signals representing the abscissa and ordinate values of function points. Some available display devices are capable of drawing lines between display function points.

Figure 2:
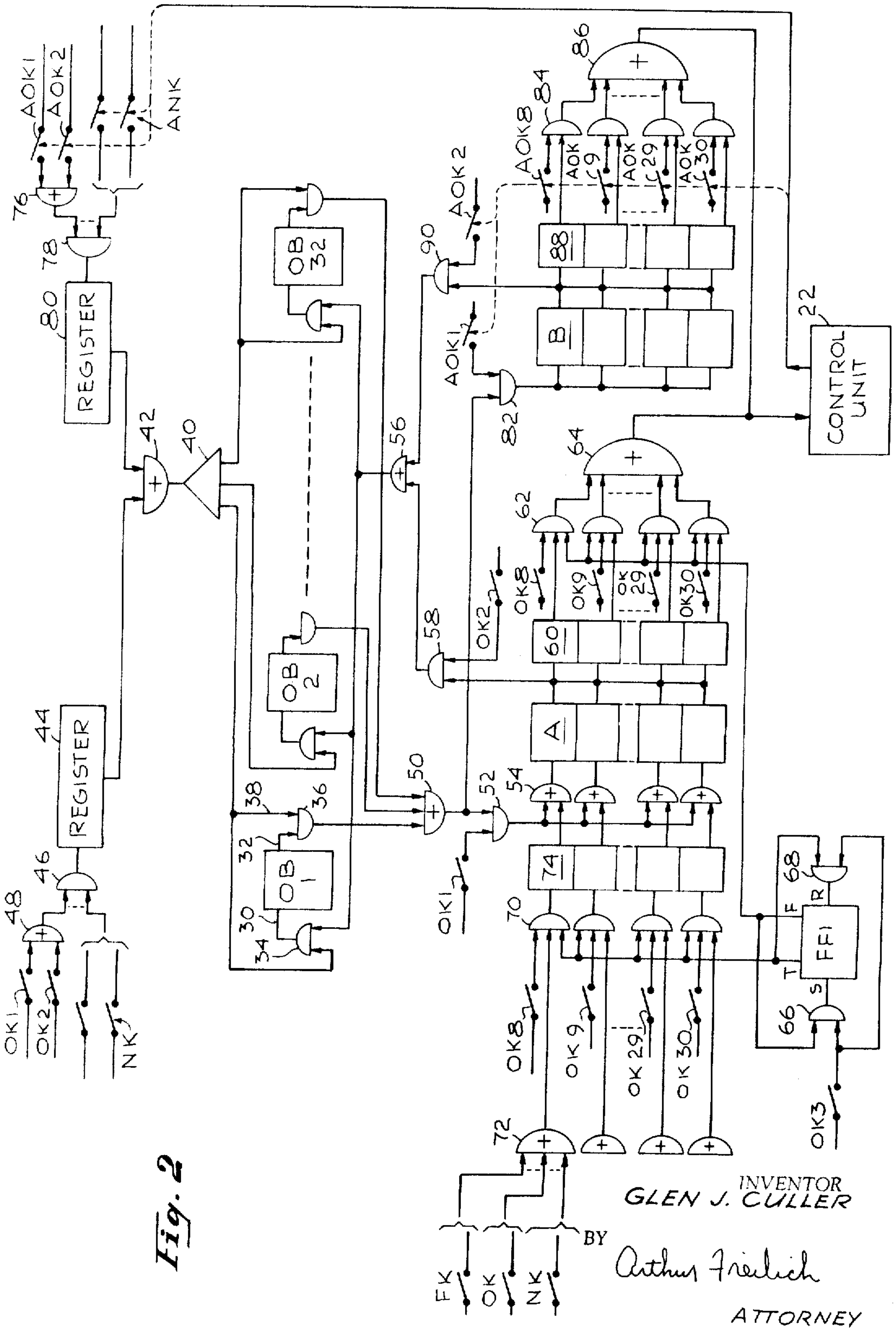
FIG. 2 is a logical diagram illustrating the system apparatus permitting the user to assembly subroutines and selectively initiate the operation.

Attention is now called to FIG. 2 of the drawings which illustrates means for transferring overlays between the overlay blocks in the large memory 12 and the A and B registers in the computer memory 20 together with means responsive to actuation of the operator keys for transferring the subroutine contents of locations in the A and B registers to the computer control unit 22. Additionally, FIG. 2 illustrates how user constructed subroutines can be associated with keys corresponding to blank overlay locations and how such user constructed subroutines are utilized to perform the operations desired. For the sake of clarity, it has been assumed that a closed key connected to the input of a gate applies a true logical signal to the gate. Also, in most instances, a single line has been used to represent connections between elements although it is well recognized that in fact several such connecting lines would have to be provided if digits are to be transferred in parallel.

Associated with each of the overlay blocks is an input conductor 30 and an output conductor 32. Input conductor 30 comprises the output of AND gate 34 while output conductor 32 is connected to the input of AND gate 36. A second input to AND gate 36 comprises a selection line 38 which is connected to a unique output terminal of decoder circuit 40. The input to decoder circuit 40 is connected to the output of OR gate 42, one of whose inputs comprises the output of an overlay block address register 44. Connected to the input of register 44 is the output of an AND gate 46. One input to the AND gate 46 is connected to the bank of numeric keys on the keyboard 16. A second input to the AND gate 46 comprises the output of OR gate 48 whose inputs respectively are connected to operator keys OK1 and OK2 which it will be assumed respectively initiate the OVERLAY IN and OVERLAY OUT subroutines.

More particularly, when a user desires to transfer an overlay from one of the overlay blocks to the A register, he will actuate the OVERLAY IN key OK1 to thereby enable AND gate 46. It is pointed out that each of the operator keys actuated will remain actuated until a subsequent operator key is actuated. Consequently, AND gate 46 will be enabled while the numeric keys are actuated by the user to identify a particular overlay or in other words an overlay block address. This overlay block address is entered into register 44 and is decoded by decoder network 40. As a consequence, the AND gate 36 associated with the identified overlay block will be enabled to thereby pass the contents of the associated overlay block therethrough.

The outputs of all of the AND gates 36 are connected to the inputs of an OR gate 50. The output of OR gate 50 is connected to the input of AND gate 52. A second input to AND gate 52 comprises the operator key OK1. The AND gate 36 enabled in response to the actuation of operator key OK1 and certain numeric keys will pass the contents of the associated overlay block which will thereby be entered through gates 50 and 52 into OR gates 54, each of which is connected to the input conductor associated with a different one of the A register locations.

The contents of the A register can be transferred back to a selected one of the overlay blocks in large memory 12 in response to the actuation of the OVERLAY OUT key OK2. The address of the overlay block to which the information in register A is desired to be transferred is entered into the register 44 by actuating OVERLAY OUT key OK2 prior to the actuation of the numeric keys identifying the block. The entry of the address into register 44 enables the gate 34 associated with the selected overlay block. A second of the inputs to each of OR gates 34 comprises the output of OR gate 56. One of the inputs to OR gate 56 comprises the output of AND gate 58. A first of the inputs to AND gate 58 comprises the output conductors associated with each of the locations in register A. A second input to AND gate 58 comprises the OVERLAY OUT switch OK2.

So long as a particular overlay is stored in the A register, any one of the subroutines therein can be selected and transferred to the control unit 22. Note that each of the A register location output lines in addition to being connected to the input of AND gate 58 is connected through a sequencing device 60 to the input of a different AND gate 62. Also connected to the input of each of the AND gates 62 is a different one of the operator switches. Note that operator switches OK8–OK30 are illustrated as associated with register A in FIG. 2. For the sake of hardware simplicity, the seven subroutines which it has been indicated are common to all of the overlays are wired in, rather than programmed, in order to better illustrate the invention. More particularly, it will be noted that operator keys OK1, OK2, and OK3 are illustrated in FIG. 2 as providing gating signals to gates for effecting the desired functions. At the option of the system hardware designer, these can be wires as illustrated, or the logical operations performed in response to the actuation of these switches can be treated as if they were any other subroutine and be processed by the control unit 22. Although not shown, the operator keys OK4–7, whose subroutines are also common to all the overlays, can either be wired in or programmed.

A third input to each of AND gates 62 comprises the false output terminal of a flip-flop FF1 which is controlled by the PROGRAM key OK3 and whose utility will be more readily understood below. With an overlay stored in register A, and in response to the actuation of an operator key, e.g. OK9, the contents of location 9 in the A register will be gated through the AND gate 62 associated therewith, the OR gate 64, and entered into the control unit 22. The subroutine contents read from location 9 in response to the actuation of key OK9 will usually consist of a sequence of instructions. The sequencing device 60 is provided for the purpose of sequentially gating these instructions through to the control unit 22. In lieu of providing the sequencing device 60, the entire subroutine contents could be directly transferred from location 9 of register A to the control unit 22 and the instructions sequence can be determined by the control unit 22.

In addition to being able to initiate subroutines which form part of the overlay stored in the A register, as previously noted, the system incorporates the capability of permitting the user to construct subroutines and effectively associate these subroutines with blank locations in the overlay in the A register. For example, let us assume that overlay 3 has been entered into the A register and that it is desired to construct the SINE subroutine and enter this subroutine into location 9 to the A register. As previously discussed, it is desirable to have this capability so that subsequent to the initial subroutine construction, the user can initiate the subroutine merely by causing overlay 3 to be entered into the A register and thereafter actuating operator key OK9. In order to construct the subroutine in location 9 of the A register, the PROGRAM key OK3 is actuated. Key OK3 is connected to the input of AND gate 66 whose output is connected to the set input terminal of flip-flop FF1. A second input to AND gate 66 comprises the false output terminal of flip-flop FF1. The key OK3 is also connected to the input of AND gate 68 whose output is connected to the reset input terminal of flip-flop FF1. The true output terminal of flip-flop FF1 is connected to the input of AND gate 68. In response to the actuation of PROGRAM key OK3, flip-flop FF1 will be set. The true output terminal of flip-flop FF1 is connected to the input of each of a plurality of AND gates 70. A second input to each of the AND gates 70 comprises a different one of the operator keys OK8–OK30. A third input to each of the AND gates 70 comprises the output of an OR gate 72 whose inputs are respectively connected to the operator key, function key and numeric key banks. The output of each of AND gates 70 is connected to the input of a sequencing device 74 whose output in turn is connected to the input of an OR gate 54.

In order to construct a subroutine and enter it into a desired location in the A register, the PROGRAM key OK3 is actuated thereby setting flip-flop FF1. Effectively when flip-flop FF1 is set, a transfer-in condition with respect to register A is defined while when flip-flop FF1 is reset, a transfer-out condition is defined. If it is desired that the constructed subroutine be entered into location 9, key OK9 is then actuated to thereby enable the AND gate 70 associated with location 9 in the A register. Thereafter, the keys on keyboard 16 are actuated in an appropriate sequence to perform the desired subroutine. That is, the "dry run" previously discussed is performed. In response to each key actuation, an appropriate identifying signal is entered through OR gate 72 and through the enabled AND gate 70, that is the AND gate 70 associated with location 9 of the A register, and through the OR gate 54 to location 9 of the A register. The sequencing device 74 serves the purpose of assuring that the indications of the key actuations are recorded in the A register location in the sequence in which they occur.

After the user has constructed a complement of subroutines from the basic subroutines originally provided, actuation of the keys which he has labelled and associated with these constructed subroutines should initiate the same response to each key actuation, an appropriate identifying key actuations in the recorded list comprising the constructed subroutines were manually actuated. Assume that the overlay in the A register has a user constructed subroutine in location 9 and that operator key 9 is now actuated. The sequencer 60 will cause the list of key actuations stored in location 9 of the A register to be read out through gates 62 and 64 into control unit 22 in the appropriate sequence. In response to this information, the control unit 22 will cause the appropriate overlay to be entered into the B register. That is, if, for example, the first instruction in the constructed subroutine being read out of location 9 of the A register indicates the actuation of the OVERLAY IN key OK1, the control unit 22 will respond thereto to actuate an automatic OVERLAY IN key AOK1. This key is connected to the input of an OR gate 76 whose output is connected to the input of an AND gate 78. The output of AND gate 78 is connected to the input of an overlay block address register 80. If the second entry in the constructed subroutine in location 9 of the A register specifies overlay 3, then the control unit 22 will respond thereto by actuating the appropriate keys ANK in the automatic numeric key bank. For example, if overlay 3 is referred to, the keys in the automatic numeric key bank will be actuated so as to enter an address representing overlay 3 into the register 80 through enabled gate 78. The output of register 80 is connected to the input of OR gate 42. The selection of a particular block in response to the output of OR gate 42 is the same as previously described. However, the contents of an overlay block read out through OR gate 50 will be entered through AND gate 82 to the B register instead of being entered through AND gate 52 to the A register. AND gate 82 will be enabled as a result of the automatic operator key AOK1 being actuated. The third entry in location 9 of the A register might well be actuate operator key OK13. The control unit 22 in response to this indication will actuate the automatic operator key AOK13 thereby causing the contents of location 13 of the B register, or in other words overlay 3, to be entered through an AND gate 84 and OR gate 86 to the control unit 22. Sequencing devices 88 are coupled to the output conductors associated with each of the locations of the B register and serve the same function as the previously discussed sequencing devices 60. A subsequent instruction derived from location 9 of the A register might indicate that the OVERLAY OUT key OK2 was actuated subsequent to the actuation of the operator key OK13. In response to this latter indication, the control unit 22 will actuate the automatic OVERLAY OUT key AOK2 and subsequent indications identifying an overlay block address will cause the overlay contents of the B register to be entered into the identified overlay block. The contents of the B register are transferred to the overlay block through AND gate 90, one of whose inputs comprises the outputs of each of the B register locations and a second of whose inputs is connected to the automatic OVERLAY OUT key AOK2.

From the explanation of FIG. 2, the equipment responsive to actuations of the operator and numeric keys should be apparent. That is, it should now be understood how overlays can be transferred from the overlay blocks of the large memory 12 to the A register and how the user can construct subroutines from basic subroutines and record a sequence of key actuations comprising the constructed subroutine in a selected location in an overlay. In response to subsequently accessing the contents of such a location, the control unit 22 will effectively actuate automatic operator function, and numeric keys in the same sequence as they had been actuated by the user in the dry run. Therefore, several basic subroutines can be associated with one another in a user constructed subroutine which can thereafter be initiated by the user in response to the actuation of only one operator key.

Figure 3:
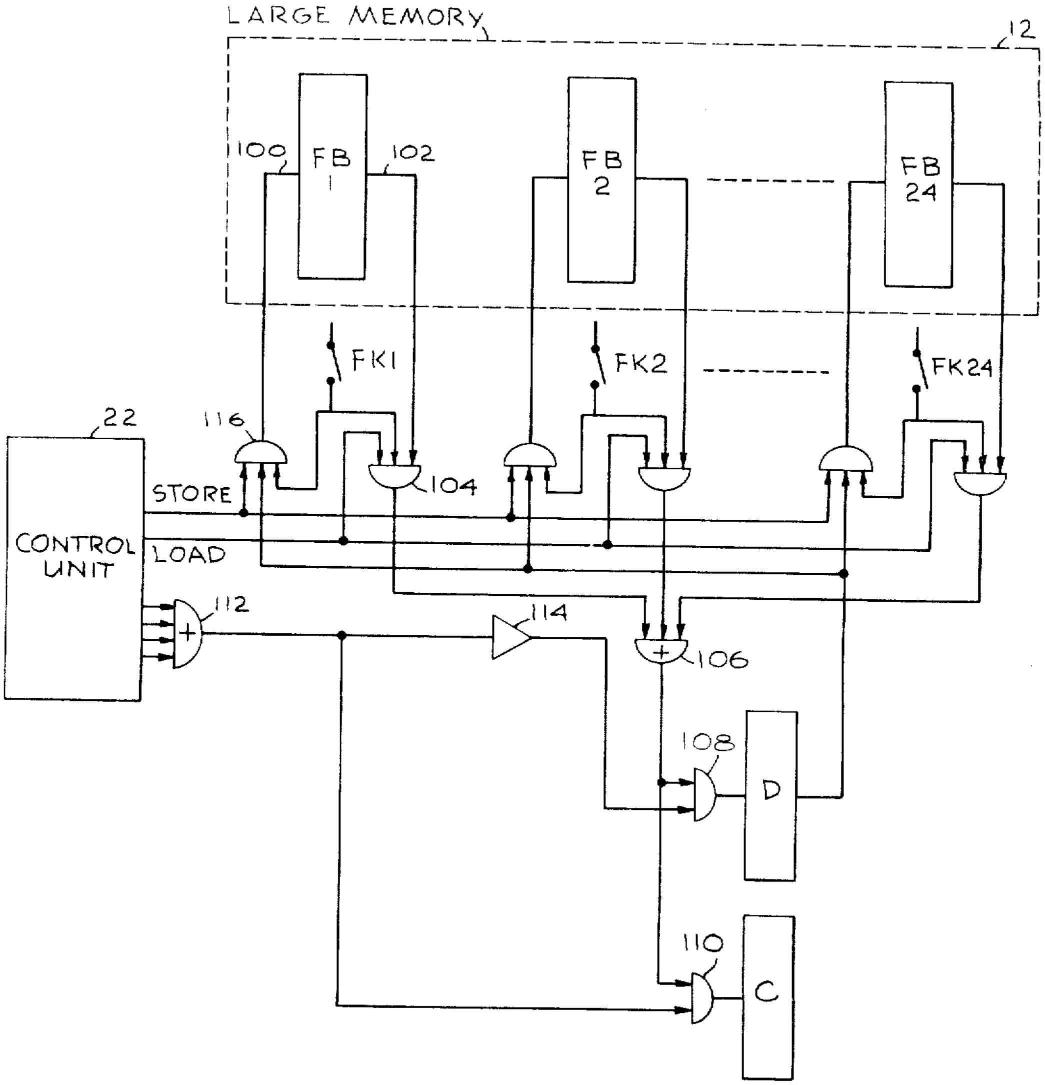
FIG. 3 is a logical block diagram illustrating the apparatus which enables functions to be transferred between function blocks in the large memory and function registers.

Attention is now called to FIG. 3 of the drawings which illustrates the apparatus utilized to transfer functions stored in the function blocks of the large memory 12 to and from the D and C registers in the computer memory 20. Each of the function blocks in the large memory 12 is provided with an input conductor 100 and an output conductor 102. The output conductor 102 from each of the function blocks is connected to the input of a different AND gate 104. A second input to each of the AND gates 104 is connected to the function key associated with the same function block. That is, the AND gate 104 connected to the function block 1 has an input connected to the function key FK1. A third input to each of the AND gates 104 is connected to the LOAD output line of control unit 22. The LOAD output line is made true in response to the LOAD subroutine being entered into the control unit 22. The output of each of gates 104 is connected to the input of an OR gate 106 whose output in turn is connected to the inputs of AND gates 108 and 110. The outputs of gates 108 and 110 are connected to the inputs of the D and C registers, respectively.

As previously noted, in the performance of certain operations, functions must be entered into the C register as well as the D register. For example, in the performance of addition, subsequent to the entering of a function into the D register and after actuating the arithmetic+operator key, the subsequent actuation of a function key should cause a function to be entered into the C register. Control unit output lines associated with all such operations which necessitate the entry of functions into the C register are connected to the input of an OR gate 112 whose output is connected directly to the input of AND gate 110 and through inverter 114 to the input of AND gate 108.

The output of the D register is connected to the input of each of gates 116 whose output in turn is connected to the input line 100 of a different function block. A second input to each of the AND gates 116 is connected to a function key associated with the same function block to which the gate 116 is connected. That is, the gate 116 whose output is connected to the input of function block FB1 has an input which is connected to the function key FK1. A third input to each of gates 116 is connected to a STORE output line from control unit 22. In response to the STORE subroutine being entered into the control unit 22, the STORE output line is made true to thereby enable the gate 116 associated with an actuated function key. In this manner, functions are transferred between the function blocks of the large memory 12 and the D register in the computer memory 20.

In view of FIGS. 2 and 3, it should now be understood how overlays and functions in response to the selective actuation of operator and function keys are transferred between the large memory and the registers in the computer memory 20. FIG. 4 illustrates the manner in which the functions are stored in the C and D registers. Of course, the functions are similarly stored in the function blocks of the large memory 12. Assume that functions 3 and 7 were transferred to the D and C registers in response to the actuation of certain operator and function keys. Note that in each of the C and D registers, 101 numbers representing 101 abscissa values are stored and similarly that 101 numbers representing 101 ordinate values are stored. Further note that scale factors $s_x$ and $s_y$ are stored along with each of the functions. Analogizing the construction of the C and D registers to conventionally organized memories, it can be considered that each of the numbers and scale factors in the registers is stored in a different word location in the register. An input and output line to each of the word locations in the C and D registers is coupled to the arithmetic and logic unit 24 which is controlled by the control unit 22. In response to the actuation of function key FK3 function 3 is entered into the D register. In response to the sequential actuation of an operator key initiating an arithmetic+subroutine and the actuation of function key FK7, function 7 will be entered into the C register. The control unit 22 will respond to the arithmetic+subroutine by adding together corresponding ordinate values from the C and D registers while leaving the abscissa values unmodified. It is assumed that the 101 abscissa values in the C register are the same as the 101 abscissa values in the D register. The arithmetic operations will properly take into account the scale factors associated with each of the functions. Accordingly, it has been seen that the present system is particularly adapted to operate on mathematical functions by automatically performing the same operations with respect to all ordinate values in a function. That is, whereas in conventional scientific computers, a sequence of operations are performed on one entry in a list of values representing a function prior to performing operations on a subsequent list entry, herein each individual operation is performed with respect to an entire list prior to performing the subsequent sequential operation. It is however pointed out that although operations are performed with respect to entire lists, limits can be defined so that not every list entry is actually operated upon. Where two functions are involved the same operations are performed on ordinate values in different functions associated with corresponding abscissa values and the same operations are performed with respect to all the ordinate values in the functions.

In the typical operation of the on-line computer system herein disclosed, a user begins his problem analysis by entering an initial complement of basic subroutines into the overlay blocks and functions into the function blocks of the large memory 12. After working with the console 14 for a sufficient period of time, creating and checking (by observing the character of displayed curves, examining individual numerical values, running test cases, etc.) the user can gain considerable knowledge as to the nature of his problem and the subroutines he will need to carry his analysis to a satisfactory completion. When the user's period of operation is finished, he actuates one of the operator keys to initiate a SYSTEM DUMP subroutine which causes the information stored in both the computer memory 20 and the large memory 12 to be transferred into a designated section of a very large memory, such as magnetic tape. The on-line computer system is then available for use by a second user. When the initial user returns, his information can be transferred from the magnetic tape back into the large memory and the computer memory in precisely the same state as when he had completed his initial investigation. In the interim, that is, between the times the initial user uses the apparatus, a second user is able to load his information from tape into the large memory 12 and computer memory 10. The system can appear completely different to the first and second users inasmuch as each user can have a considerably different range of subroutines available to him. In other words, each user effectively is able to create his own language and label the various keys accordingly. The use of the term labelling can be taken literally or figuratively. That is, labels can actually be provided on the keys by utilization of some type of removable overlay, made for example of plastic, upon which key designations can be handwritten. In lieu thereof, the user can merely keep track of his labels in a notebook.

The foregoing has assumed a system in which only a single user can operate the equipment at any one time. Realizing that the memory and computer can perform most functions at a rate considerably faster than that at which the user is able to operate, the system can be extended so as to simultaneously accommodate a number of users all equipped with their own keyboards and displays but all sharing the same large memory and digital computer components. A relatively simple commutation system can be utilized to couple each user's console to the computer and the key actuations can be processed in the sequence in which they occur.

In order to further illustrate the utility of the disclosed system and demonstrate its effectiveness for problem analysis, the following discussion will be directed to the choice of basic subroutines which experience has indicated are useful for the solution of certain types of problems and the details of a sample problem and general solution therefor will be investigated.

A useful set of basic subroutines can be considered as including three different subroutine groups: namely (1) subroutines for performing mathematical operations (2) subroutines for aiding in the construction of user-constructed subroutines, and (3) subroutines useful for performing display and input and output functions. Prior to presenting a list of subroutines with definitions, some initial comments might prove helpful. Included in the subroutines for performing mathematical operations are those, of course, for performing arithmetic operations which, it will be recalled are performed on functions. There are at least three ways of carrying out function arithmetic; namely, fixed point (with respect to the entire function), floating point (with respect to the entire function), or floating point for each point of the function. Since each way has its own virtues, it is desirable to allow the user a free choice. Thus, for example, an overlay 01, arithmetic can be done in a fixed point fashion. That is, when two functions are added, the $s_y$ scale factors are compared and the smaller of the two is made equal to the larger one, the associated mantissa values being decreased (i.e. shifted to the right) enough times so that the functional values (mantissa plus scale factor) remain unchanged. The mantissa ordinate values are then simply added. If at some point the sum of two ordinate values is greater than 1, there will be an overflow which will be readily apparent if the sum is displayed. However, the overflow may occur in the course of the execution of a user constructed subroutine and thereby introduce problems. Similar comments of course apply to a fixed point divide operation which will overflow at any point where the mantissa of the numerator exceeds the mantissa of the denominator.

Overlay 02 can provide protection against such overflows by first floating and then contracting both summands before addition. In division, the numerator and denominator are first floated and the numerator is contracted enough times to prevent overflow at any point. Overlay 03 can be used to initiate arithmetic operations on a floating point basis for each individual point of the functions.

The following represents a list of basic subroutines which experience has indicated are useful in problem analysis. It is not herein suggested that this is an optimum list or a minimum or maximum list but merely that it represents a repertoire which has proven useful. Undoubtedly good arguments could be made for increasing or narrowing the scope of the number of basic subroutines provided but a final decision as to such matters clearly depends upon the anticipated use of the system.

MATHEMATICAL SUBROUTINES

LOAD: LOAD FK1 brings the function in function block 1 into the D register.

STORE: STORE FK1 transfers the function in the D register into function block FB1 in the large memory 12.

FLOAT MANTISSA: The ordinate values in the D register are shifted left as many times as possible without causing any one of them to overflow and the associated scale value $s_y$ is adjusted appropriately. The abscissa values in the D register are left unchanged.

PLUS (+): In overlay 01, PLUS FK1 transfers the function stored in function block FB1 into the C register and then compares the scale factors $s_y$ of the C and D registers. If these factors are equal, corresponding ordinate values in the C and D registers are added together and left in the D register. If the scale factors are unequal, the function with the smaller scale is contracted until the scales are equal and the addition is then performed. The abscissa values of the D register are left unchanged. If the same operation is performed in overlay 02, both functions are floated, each is contracted once, and the addition is then carried out as on overlay 01.

MULTIPLY (.): In overlay 01, multiply FK1 transfers the function stored in function block FB1 into the C register, multiples its ordinate values by corresponding ordinate values in the D register, adds the respective ordinate scale factors, and leaves the result in the D register. In the same operation in overlay 02, each function is first floated.

MINUS (−): Subtraction is performed in the same fashion as addition.

DIVIDE (÷): In overlay 01, divide FK1 enters the function stored in function block FB1 into the C register, divides the ordinate values in the D register by corresponding ordinate values in the C register, subtracts the respective scale factors, and leaves the results in the D register. When the same operation is performed in overlay 02, each function is first floated and numerator is then contracted enough times to prevent overflow at any point.

SQUARE ROOT: Square root FK1 takes the square root of the function stored in function block FB1 and leaves the result in the D register.

LEFT SHIFT: The ordinate values in the D register are shifted one place to the left, i.e. $y_{n+1}$ replaces $y_n$, 1 is less than or equal to $n$ which is less or equal to 100 $y_{101}$ is left unchanged.

RIGHT SHIFT: The ordinate values of the D register are shifted one place to the right, i.e. $y_{n-1}$ replaces $y_n$, 2 is less than or equal to $n$ which is less than or equal to 101, and $y_1$ is left unchanged.

EVALUATE: This subroutine permits the user to evaluate a function in the D register at the value of the abscissa value nearest to any selected number, previously stored as a constant function in one of the function blocks. In response to the actuation of the EVALUATE operator key followed by the actuation of the key FK2, the function stored in function block FB2 is entered into the C register. Subsequently, the ordinate values in the C register are subtracted from the abscissa values in the D register. The ordinate value in the D register corresponding to the smallest of these differences is selected and all ordinate values in the D register are set equal to that smallest ordinate value.

EXPAND Y: The ordinate values of the D register are multiplied by 2 (assuming a binary system, this is accomplished merely by shifting the values in the D register one place to the left) and the scale factor $s_y$ is reduced by one.

CONTRACT Y: The ordinate values of the D register are multiplied by ½ (again assuming a binary system this can be accomplished by merely shifting right one place) and the scale factor $s_y$ is increased by one. It is to be noted that the performance of both the EXPAND and CONTRACT subroutines leave the numerical value of the function unchanged since a change in scale appropriately compensates the alteration in mantissa values. However, since only the mantissa values are displayed, the appearance of the function on the cathode ray tube display device is altered. The user is therefore able to employ the EXPAND subroutine to examine in detail the small amplitude structure of a curve, letting the other portions of the curve overflow (being careful, of course, to retain the original representation of the function in some storage block). The EXPAND subroutine extends the capability of the FLOAT mantissa subroutine. Use of overlay 01 (fixed point arithmetic) requires that the CONTRACT subroutine be available in order to avoid overflow in addition and subtraction. In addition, the EXPAND and CONTRACT subroutines are useful in bringing curves to a common scale for a visual comparison.

δ FUNCTION: This subroutine enables a user to create a Kronecker-script delta type function, i.e. one which has the value 1 at any one point and zero everywhere else. To create the function $\delta_a = \delta(x-a)$, a constant $a$ is entered into the D register and then δ function key is actuated. The desired function then appears in the D register, i.e., all of the ordinate values in the D register are made equal to zero except for the ordinate value corresponding to the abscissa value nearest or equal to $a$, and this ordinate value is set equal to one.

EXPONENTIAL: This subroutine causes the exponential of the function in the D register to be computed with the result being left in the D register.

SINE-COSINE: This subroutine causes the sine of the ordinate values and cosine of the abscissa values in the D register to be computed and placed in the D register.

J-GEN: This subroutine causes the function, $y=x$, $-1 \leq x \leq +1$, to be generated in the D register.

REFLECT: The abscissa and ordinate values and scale factors in the D register are interchanged.

SUBSTITUTE: The ordinate values in the C register are transferred to the D register and substituted for the abscissa values therein. The appropriate scale factor is also transferred. This subroutine permits, for instance, the cross plotting of two dependent variables which are functions of the same independent variable. Together with the REFLECT subroutine, it permits a user to easily construct subroutines for complex-valued functions of complex arguments using only real function basic subroutines.

INTEGRAL TRANSFORM: The integral transform $$\tilde{f}(x) = \int_a^b dx' K(x, x') f(x')$$

of the function $f$ stored in the D register is computed, using a kernel $K(x, x')$ which can be stored on magnetic tape in the form of 101 functions of $x'$, one for each value of $x$. Assuming that the tape has been correctly positioned and that $f$ is in the D register, the subroutine is initiated by actuating the INTEGRAL TRANSFORM key. The first of the 101 functions, i.e., $K(a, x')$, is then read into the C register and multiplied by the function in the D register. The definite integral is computed and the resulting number is stored in the first abscissa position of the D register. The next function, i.e., $K(a+\epsilon, x')$, $\epsilon=(b-a)/100$, is then read into the C register and the process repeated, the result being stored as the second abscissa value of the D register. At the completion of the operation, $f$ is still contained in the ordinate values and $\tilde{f}$ is in the abscissa values of the D register. To transform the latter into standard form one could, for example: REFLECT STORE FK1, LOAD 0+FK1 (the addition to 0 being one means of restoring the abscissa values of the D register to the canonical form used for the displays).

RELATIVE-INTERPOLATE: This subroutine permits the user to enter individual data points to modify a function stored in the D register. For example, if $P_a$ and $P_b$ are two of the data points, in response to this subroutine, the two points $\bar{P}_a$ and $\bar{P}_b$ in the function in the D register whose abscissa values match the abscissa values of points $P_a$ and $P_b$ are located. Assuming L to be the straight line $P_aP_b$ and $\bar{L}$ the straight line $\bar{P}_a\bar{P}_b$, the function in the D register is replaced by $(f-\bar{L}+L)$ for $x_a$ equal to or less than $x$ equal to or less than $x_b$. The function is left unchanged outside of the range between $x_a$ and $x_b$.

DELTA (Δ): This subroutine effects a differentiation by simply taking the difference between adjacent ordinate values of a function in the D register while leaving the result in the D register.

SIGMA (Σ): This subroutine effects a function integration by developing the cumulative sum of the ordinate values in the D register while leaving the result in the D register.

The following subroutines are distinguishable from the preceding subroutines inasmuch as they do not initiate mechanical operations on functions per se but instead are provided to enable the user to manipulate the functions for display and programming purposes.

PROGRAM: Initiation of this subroutine permits a user to construct and record a subroutine in a desired overlay location.

REPEAT: Initiation of this subroutine merely enables other subroutines to be performed more than once without requiring that they be initiated for each performance.

TALLY: This subroutine is incorporated in a user constructed subroutine for the purpose of accomplishing conventional programming techniques such as branching. In response to this subroutine, the scale factor $s_y$ in the D register is determined. If $s_y$ is positive it is reduced by one and performance of the user constructed subroutine continues. If on the other hand $s_y$ is zero or negative, performance of the user constructed subroutine is not continued but instead the computer jumps to the end of the particular subroutine.

COMPARE: This subroutine is similar to the TALLY subroutine but uses the initial ordinate value in the D register as the criteria.

DISPLAY OVERLAY NUMBER: This subroutine causes the number of the overlay stored in the A register to be displayed by the cathode ray tube display device.

ERASE: This subroutine causes all curves displayed by the cathode ray tube to be erased.

DISPLAY: In response to the actuation of the DISPLAY operator key followed by the actuation of key FK1, the function stored in function block FB1 is displayed. Subsequent actuation of key FK1 erases the displayed function. Subsequent actuation of other function keys causes corresponding functions to be displayed until another operator key is actuated.

DISPLAY VALUE AND SCALE, BINARY: This subroutine causes the mantissa of the initial ordinate value in the D register and the scale factor $s_y$ of the D register to be displayed in binary form.

DISPLAY VALUE, DECIMAL: This subroutine causes the initial ordinate value in the D register to be multiplied by $2^s y$ and displayed as a decimal mantissa times a power of 10.

PRINT: This subroutine causes the function stored in the D register to be printed out on, e.g. a flexwriter in conventional format, i.e., the abscissa and ordinate values of the function are listed in decimal form.

SYSTEM LOAD: In response to the initiation of this subroutine, an entire system comprised of overlays and functions is loaded from tape into the large memory and computer memory.

SYSTEM DUMP: In response to this subroutine, the contents of the large memory and computer memory are transferred to a very large memory, as for example, magnetic tape.

OVERLAY IN: In response to the initiation of this subroutine, a transfer is effected between one of the overlay blocks and the A register.

OVERLAY OUT: In response to this subroutine, an overlay is transferred from the A register to a specified overlay block.

The extension of the present system to a multi-user computer system has been referred to. This can be accomplished by providing a console for each user and coupling each console to the computer and large memory on a time sharing basis. It has been mentioned that such a system could prove to be extremely economical inasmuch as the rate at which large scale computers can perform most operations initiated by a user, is much greater than that at which the user himself operates. On the other hand, where extremely complex subroutines are created by a user and as a consequence considerable execution time must be made available to the computer, a situation could develop where the user must wait for the computer's response to a user initiated operation. In a properly balanced system, it is desirable that neither the user nor the computer have to wait very long for the other. Consequently, where complex user constructed subroutines are to be employed, it may be desirable to increase the system capability of a single or multi-user system by incorporating a second computer which has access to the large memory. In order to permit the user to put the second computer into operation, an operator key can be provided on the user console for enabling the second computer to operate as the first computer, while the first computer is executing a lengthy subroutine. It is pointed out that although, in the preferred embodiment of the invention, the user is provided with manually operable means, for example, a keyboard to initiate operations, in other embodiments of the invention, other means, as e.g. telephone voice actuated means could be employed. Thus, it should be clear that the term "manual" as used herein is not to be limited as having to do with the hands but rather should be interpreted more broadly as merely user initiated, whether by hand, voice, or otherwise.

As an illustration of the use of the on-line computer system herein described, the solution of a typical problem will now be set forth. The problem involves a linear integral equation for a complex function of a real variable. The inclusion of this problem should be understood as being for illustrative purposes only and should in no way be interpreted as a limitation upon the disclosed system.

The problem is presented as a mathematical one with the context of physics from which it arose, essentially suppressed. Initially, the mathematical methods which can be utilized in the solution will be described and some of the more significant user constructed subroutines generated in the implementation of these mathematical methods will be mentioned. The method of solution adopted is itself the result of mathematical experimentation.

A study of the longitudinal wave fluctuations in an electron-ion plasma subjected to an external electric field leads to the following integral equation for the fluctuation electric field, of wave number $k$, as a function of time:

$$E(t)+\int_0^t dt'\{K_e(t-t')\exp i[\phi(t)-\phi(t')]+ \delta K(t-t')\exp i\delta[\phi(t')-\phi(t)]\}E(t')=I(t),\ 0\leq t\leq T \quad (3)$$

where $$K_e(t)=te^{-k^2t^2/4}\quad K_i(t)=te^{-\delta k^2t^2/4}\quad \phi(t)=\epsilon t^2/2+ut\quad \delta=1/1836$$

and $I(t)$ is given. (Units have been chosen in which the electron thermal speed $(2T/m)^{1/2}$ and the plasma frequency, $(4\pi ne^2/m)^{1/2}$, are unity.)

Using an operator notation for the integral transforms in (3), $$\underset{\sim}{K_e}\cdot E\equiv\int_0^t dt' K_e(t-t')E(t'),\ \text{etc.} \quad (4)$$

Equation 3 can be written as:

$$E+e^{i\phi}\underset{\sim}{K_e}\cdot(e^{-i\phi}E)+\delta e^{-i\delta\phi}\underset{\sim}{K_i}\cdot(e^{i\delta\phi}E)=I \quad (5)$$

Over the time interval of interest ($T\approx 10\pi$) the norm of the first operator in (5) is so large, for $k\leq 1$, that an attempt at direct iteration proves to be useless. (As can be seen from the soluble special case, $k=\delta=\phi=0$, this corresponds to computing sin $t$ by a power series on the interval $0\leq t\leq T$.) However, the transformation $$F=e^{-i\phi}E \quad (6)$$

an integral equation for F, $$F+\underset{\sim}{K_e}\cdot F+\delta e^{-i\psi}\underset{\sim}{K_i}e^{i\psi}F=J=Ie^{i\phi}=(1+\delta)\phi \quad (7)$$

which can be solved by iterating only the last of the terms on the left hand side. The equation $$F+\underset{\sim}{K_e}\cdot F=A \quad (8)$$

has the solution $$F=A-\underset{\sim}{L_e}\cdot A \quad (9)$$

where $$\underset{\sim}{L_e}$$

is, like $$\underset{\sim}{K_e}$$

a translate type integral operator and hence specified by a single function $L_e$ $$\left[\text{i.e., } L_e\cdot A\equiv\int_0^t dt' L_e(t-t')A(t')\right]$$

which must obey an equation like (8) with A replaced by $K_e$:

$$L_e+\underset{\sim}{K_e}\cdot L_e=K_e \quad (10)$$

Having once found (for given $k$) the function $L_e$, we write (7) as $$F=(1-\underset{\sim}{L_e})\cdot[J-\delta e^{-i\psi}\underset{\sim}{K_i}\cdot(e^{i\psi}F)] \quad (11)$$

and solve it by iteration $$F_{n+1}=(1-\underset{\sim}{L_e})\cdot[J-\delta e^{-i\psi}\underset{\sim}{K_i}\cdot(e^{i\psi}F_n)] \quad (12)$$

With a reasonable initial guess, e.g., $F_0=J$, it can be found that this converges splendidly (three iterations). From F, $E=e^{i\phi}F$ can be computed.

The first step is to find $L_e$ from (10). For the reasons noted above, straight iteration is ruled out. While (10) can indeed be solved with Laplace transforms, the transform of $L_{e(8)}$ involves the error function of complex argument and hence is difficult to invert. Instead, advantage is taken of the fact that problems which are "adjacent" in a mathematical sense are, within the on-line system, adjacent also in a computational sense. If $K_e$ is replaced by $$R\equiv N^2te^{-at} \quad (13)$$

then the inverse kernel function, $L_R$, satisfying $$L_R+\underset{\sim}{R}\cdot L_R=R \qquad (14)$$

is simply $$L_R=N_e{}^{-at}\sin Nt \qquad (15)$$

Therefore Equation 10 can be written in the form $$L_e+\underset{\sim}{R}\cdot L_e=K_e+\underset{\sim}{D}\cdot L_e \qquad (16)$$

$$D=R-K \qquad (17)$$

and N and $a$ can be chosen so as to make the norm of D small (e.g., $a=k$, $N=2$), thus permitting an iteration solution, $$L_e{}^{(n+1)}=(1-\underset{\sim}{L_R})\cdot(K_e+\underset{\sim}{D}\cdot L_e{}^{(n)}) \qquad (18)$$

This converges nicely (three or four iterations) to yield a result which will differ from the exact solution of (10) only in consequence of the approximation inherent in numerical methods. However, the linearity of (10) can be exploited to obtain a more accurate solution as follows: Let L be the result obtained by iterating (18) until it has converged. The error in L is measured by the size of $$P=K_e-L-\underset{\sim}{K_e}\cdot L \qquad (19)$$

and the difference $\eta=L_e-L$ satisfies $$\eta+\underset{\sim}{K_e}\cdot\eta=P \qquad (20)$$

or equivalently $$\eta=(1-L_R)\cdot(P+\underset{\sim}{D}\cdot\eta) \qquad (21)$$

i.e., an equation identical with (18) save for the inhomogeneous term. If L is determined from (18) up to a percentage error of order $\epsilon$, $\eta$ can be found from (21) also with a percentage error of order $\epsilon$ and hence get an approximation, $L+\eta$, to $L_e$ which has an error of order $\epsilon^2$. In a similar fashion a correction to $\eta$ can be found. Now it can be indicated how the on-line system can be used to solve (13). To begin with, certain function keys are assigned to the constant parameters of the problem and to the principal independent and dependent variables as shown in Table I.

| | | | |
|---|---|---|---|
| $\epsilon$ | k | u | T |
| $\delta$ | N | a | $\Delta t$ |
| t | $K_e$ | $K_i$ | R |
| $L_R$ | $L_e$ | 0 | ½ |
| L | L′ | L″ | L‴ |
| f | $\tilde{f}$ | kernel source | working space |

Locations for constant functions which the user finds it convenient to have on hand are assigned as the need arises. (The notation in Table I is the same as in Eqs. 3 through 21; the meaning of other symbols will be explained below.) Once assigned, the labels on the function keys are used in referring to these keys rather than the neutral ones (FK1, FK2, etc.).

Operator keys are then created, using the procedure for constructing subroutines, some of the principal user constructed subroutines being as follows:

[t] This creates the function $t=T(x+1)/2$ (assuming that the desired value of T has been previously stored in the T function key) and associates it with function key $t$. It also computes $\Delta t$ and associates it with function key $\Delta t$. As an illustration of the construction of a subroutine the key pushes made in programming this key are hereafter listed which we suppose is to be on, say overlay 10:

PROGRAM [$t$] 10 OVERLAY-IN 02 J–GEN. ½+½. T STORE $t$ PROGRAM (22)

INITIAL SET-UP: This simply displays on the alphanumeric scope the names of the constant parameters ($\epsilon$, T, $k$, $\delta$) and, next to each, the value presently stored for it. If the user wishes to change any of these he can, of course, do so before running the problem. This program also stores the various constants indicated in Table I and finally pushes the [$t$] key. Thus one knows that everything is in order for the start of a calculation.

[$K_e$]: This simply computes the kernel function $K_e(t)$ and stores it.

[R]: This computes and stores the function, R($t$) defined by (13), using whatever values the user has stored in N and $a$.

[$L_R$]: This computes and stores the function $L_R(t)$ defined by (15). It, for example, was programmed by:

PROGRAM $L_R$ 10 OVERLAY-IN 02 LOAD $t$. N SINE STORE $L_R$ LOAD-1. $t$ $a$ EXP. N $L_R$ STORE $L_R$ PROGRAM.

(Note that in this the $L_R$ key is used as a temporary working space to store one factor of the final answer.)

Frequently there is a need to generate on tape, the 101 functions which comprise one of our translate kernels. To produce this capability, a KERNEL-GENERATE-AUXILIARY (KGA) subroutine is associated with a key as follows:

PROGRAM KGA 10 OVERLAY-IN 02 LOAD KERNEL-SOURCE TAPE-WRITE LEFT-SHIFT STORE KERNEL-SOURCE OVERLAY-IN 10 PROGRAM. This subroutine takes whatever function is in the kernel-source space, writes it out on tape, left shifts it, and stores it back in the kernel-source space. It ends by calling in the overlay (10) on which KGA has been programmed in order that it be a repeatable key. The key which will actually produce the kernel on tape is then made by simply repeating the KGA key, i.e., a KERNEL-GEN key is made as follows:

PROGRAM KERNEL-GEN 10 OVERLAY-IN 10 REPEAT KGA 100 PROGRAM (Repeat [K] followed by a number, $n$ causes key [K] to be repeated $n$ times.)

It is clearly now a simple matter to make, for any desired value of $k$, the various functions and kernels needed for (18). It remains only to program a key which will carry out one iteration of (18). Since many integral transforms will be taken, it proves convenient to incorporate the hand-programmed integral transform key (which produces in the abscissa values of the D register the transform of the function in the ordinate values of the D register) into a simple subroutine which will produce in the $\tilde{f}$ space the transform of whatever function has been stored in $f$ on bank I. This is designated as INT-TRANS and is used to program a new key, ITERATE-$L_e$ which does one pass of (18) as follows. Assume that the kernel D has been stored on tape and, following it, the kernel $L_R$; that the tape is positioned to the beginning of the D kernel; and that some initial guess, or the result of a previous iteration is in $L_e$ on bank I. The following keys are then actuated:

PROGRAM ITERATE-$L_e$ 10 OVERLAY-IN 02 LOAD $L_e$ STORE $f$ OVERLAY-IN 10 INT-TRANS OVERLAY-IN 02 LOAD $\tilde{f}+K_e$ STORE $f$ OVERLAY-IN 10 INT-TRANS OVERLAY-IN 02 LOAD$_I$ $f-\tilde{f}$ STORE$_I$ $L_e$ REWIND-TAPE OVERLAY-IN 10 PROGRAM (23)

Although the program (23) is adequate, certain display and storage features can be added to increase the convenience of operation. That is, after checking (with simple examples, special cases, etc.) the correctness of (23), another key, $L_e$ is programmed which first actuates the ITERATE-$L_e$ key (23) and then goes on to store the resultant $L_e$ in key L, having first moved the contents of L″ into L‴, L′ into L″, and L into L′. Thus as the new key $L_e$ is repeated, the results of the most recent four passes can be examined. In addition, the new key erases the scope and then displays on it the contents of L′ (dotted) and the contents of L (usual dot-plus line display). Thus, each time the key is pushed the user sees, as soon as the pass has been completed, both the new result and, for comparison, the previous one, so that he can judge the convergence characteristics of the iteration process (18). (One could as well display the ratio or difference of the old and new curves, etc.)

Having created the subroutines needed for (18), they can also be used for (21) and, by repeating the correction process, obtain a very accurate $L_e$. From it the user can make an $$\underset{\sim}{L_e}$$

kernel (using KERNEL-GEN) and also the $$\underset{\sim}{K_i}$$

kernel and then be in a position to solve (12), i.e., to make a key which will do one iteration of (12). The only new complication lies in the complex character of F, but this causes no real difficulty. The user can simply write out on tape two copies of $$\underset{\sim}{K_i}$$

kernel, followed by two of $$\underset{\sim}{L_e}$$

The ITERATE-F key then multiplies F by $$e^{i\psi}$$

uses the INT-TRANS key to transform the real part of the product with $$\underset{\sim}{K_i}$$

stores that in some working-space function key, transforms the imaginary part with $$\underset{\sim}{K_i}$$

combines the results into a single complex function, multiplies this by $$\delta_e^{-i\psi}$$

subtracts that from J, transforms the real part with $$\underset{\sim}{L_e}$$

then the imaginary part, etc.

This requires, of course, that the user also creates keys which produce $e^{\pm i\Psi}$ (used only after a change of $\epsilon$ or $u$) and keys which give complex arithmetic capability. Using REFLECT and SUBSTITUTE, a COMPOSE key (which, given two real functions, $x(t)$ and $y(t)$, in two standard locations composes them into a single complex function $(x, y)$ with the parameter $t$ eliminated) and a DECOMPOSE key which is its inverse can be programmed. For example, COMPOSE is made by:

PROGRAM COMPOSE 10 OVERLAY-IN 02.$f_R$ LOAD $f_I$ SUBSTITUTE STORE $f$ PROGRAM (.$f_R$ is used as a way of loading $f_R$ into the $\underset{\sim}{C}$ register.) Similarly, PROGRAM DECOMPOSE 10 OVERLAY-IN 02 LOAD $O+f$ STORE $f_I$ LOAD $f$ REFLECT STORE $f_R$ LOAD $O+f_R$ STORE $f_R$ PROGRAM (LOAD $O+f_R$ STORE $f_R$ is just a way of restoring standard $x$ coordinates to $f_R$ so that it will look normal when displayed.) From these, it is then a simple matter to make the keys for complex function arithmetic.

Using the ITERATE-F key, and the $$\underset{\sim}{L_e}$$

kernels generated by the procedure described above, it is an easy matter to obtain solutions of (3) for a variety of values of the parameters $k$, $u$ and $\epsilon$. Various results can then be displayed at the option of the user.

The embodiments of the invention in which an exclusive property or privilege is claimed are defined as follows:

1. A digital computer system comprising:
- a digital computer capable of performing a plurality of different operations;
- a digital memory coupled to said digital computer;
- means for storing representations of one or more mathematical functions in said memory including means for storing lists comprising of digital representations of abscissa and ordinate values of a plurality of different coordinates in each of said mathematical functions;
- control means for identifying one of said plurality of operations and one of said mathematical functions; and
- means responsive to said control means for causing said digital computer to perform the same identified operation on the entire list of said digital representations of all of said ordinate values of said identified mathematical function.

2. A digital computer system comprising:
- a digital computer capable of performing a plurality of different operations;
- a digital memory coupled to said digital computer;
- means for storing representations of one or more mathematical functions in said memory including means for storing lists comprised of digital representations of abscissa and ordinate values of a plurality of different coordinates in each of said mathematical functions;
- control means for identifying a sequence of one or more operations and one or more of said mathematical functions; and
- means responsive to said control means for causing said digital computer to sequentially perform said identified operations on the entire list of said digital representations of ordinate values, associated with corresponding abscissa values, in said identified functions.

3. The system of claim 2 wherein said control means includes a manually operable keyboard.

4. The system of claim 2 including:
- a display device; and
- means responsive to the identification of one of said operations for displaying the identified functions.

5. A computer system comprising:
- a computer including a control unit and a memory having first and second groups of storage locations;
- said memory storing a plurality of basic subroutines, each basic subroutine identifying a sequence of logical operations and being stored in a different one of said storage locations in said first group;
- a keyboard having a plurality of keys each of which is associated with a different one of said storage locations;
- means for selectively transferring each of said basic subroutines from its storage location in said first group to said control unit in response to the actuation of the key associated therewith;
- said memory storing a plurality of operands, each operand being stored in a different storage location in said second group; and
- means responsive to the actuation of one of said keys associated with said first group of storage locations and one of said keys associated with said second group of storage locations for performing operations identified by the subroutine contents of the identified first group location on the operand contents of the identified second group location.

6. The system of claim 5 wherein each of said operands comprises a different mathematical function and is represented by a list of abscissa and ordinate values of a plurality of different coordinates.

7. The system of claim 6 wherein said operations performed on said operands are identically performed on the entire list of ordinate values of the identified function.

8. A computer system comprising:
a computer including a control unit and a memory having first and second groups of storage locations;
said memory storing a plurality of basic subroutines, each basic subroutine identifying a sequence of logical operations and being stored in a different one of said storage locations in said first group;
a keyboard having a plurality of keys each of which is associated with a different one of said storage locations;
means for selectively transferring each of said basic subroutines from its storage location in said first group to said control unit in response to the actuation of the key associated therewith;
said memory storing a plurality of operands, each operand being stored in a different storage location in said second group; and
means responsive to the actuation of one of said keys associated with said first group of storage locations and one or more of said keys associated with said second group of storage locations for performing operations identified by the subroutine contents of the identified first group location on the operand contents of the identified second group locations.

9. The system of claim 8 wherein each of said operands comprises a different mathematical function and is represented by lists of abscissa and ordinate values of a plurality of different coordinates and wherein said operations performed on said operands are performed on entire lists of ordinate values, the operations being performed with respect to ordinate values of different identified functions associated with corresponding abscissa values.

10. A computer system comprising:
a computer;
a memory including first and second portions, each portion including a plurality of storage blocks, each block comprised of a plurality of storage locations;
means storing a basic subroutine in each of some of said first memory portion storage locations;
means storing a mathematical function in each of said second memory portion blocks;
a first memory block register having a plurality of storage locations;
a keyboard including first and second groups of keys respectively associated with said first and second memory portions;
each of said first group of keys being associated with a different one of said locations in said first memory block register;
means for entering the contents of a selected first portion memory block into said first memory block register;
a first function register;
a second function register;
means responsive to actuation of said keys in said second group for entering selected functions into said first and second function registers;
means responsive to actuation of each of said keys in said first group for accessing information from the first memory block register storage location associated therewith; and
means responsive to said accessed information for performing operations identified thereby on said functions stored in said function registers.

11. A computer system comprising:
a computer;
a memory including first and second portions, each portion including a plurality of storage blocks, each block comprised of a plurality of storage locations;
means storing a basic subroutine in each of some of said first memory portion storage locations;
means storing a mathematical function in each of said second memory portion blocks;
a first memory block register having a plurality of storage locations;
a keyboard including first and second groups of keys respectively associated with said first and second memory portions;
each of said first group of keys being associated with a different one of said locations in said first memory block register;
means for entering the contents of a selected first portion memory block into said first memory block register;
a first function register;
a second function register;
means responsive to actuation of said keys in said second group for entering selected functions into said first and second function registers;
a second memory block register having a plurality of storage locations;
means for entering the contents of a selected first portion memory block into said second memory block register;
means for selectively recording information in a selected second memory block register storage location in response to the actuation of a series of first group keys adentifying the sequence of such actuations;
means responsive to actuation of each of said keys in said first group for accessing information from the first memory block register storage location associated therewith; and
means responsive to said accessed information for performing operations identified thereby on said functions stored in said function registers.

12. The system of claim 11 wherein each of said functions is represented by lists of abscissa and ordinate values of a plurality of function coordinates and identical operations are performed with respect to the entire lists.

13. In a system including a memory storing a plurality of blocks of information, each block including a plurality of storage locations:
a first memory block register having a plurality of storage locations;
a second memory block register having a plurality of storage locations;
means initially storing a basic subroutine in each of some of said memory storage locations;
a keyboard including a plurality of keys each of which is associated with a corresponding location in said first and second memory block registers;
means selectively storing the contents of a first of said plurality of memory blocks in said first memory block storage register and the contents of a second of said plurality of memory blocks in said second memory block storage register; and
means responsive to the actuation of each of said keys for selectively either accessing the contents of the location in said first memory block register associated therewith or for recording information in a selected location in said second memory block register identifying the actuated key.

14. In a system including a memory comprised of a plurality of storage blocks, each block including a plurality of storage locations, each storage location adapted to store a subroutine:
means initially storing a basic subroutine in each of some of the memory block storage locations;
a first register having a plurality of storage locations;
a keyboard comprised of a plurality of keys including a group of operator keys, each operator key being associated with a different one of said first register locations;

means for selectively transferring the contents of one of said plurality of storage blocks to said first register;

means for selectively defining a transfer-in or transfer-out condition for said first register;

a control unit;

means responsive to said transfer-out condition and the actuation of one of said operator keys for transferring the contents of said first register location associated with said actuated operator key to said control unit; and means responsive to said transfer-in condition and the actuation of one of said operator keys and subsequent ones of said keys identifying locations in different storage blocks for recording information identifying the sequence of actuation of said subsequent ones of said keys in the first register location associated with said actuated operator key.

15. The system of claim 14 including a second register having a plurality of storage locations; and means in said control unit responsive to the transfer of said recorded information identifying a sequence of key actuations to said control unit for selectively transferring the contents of a second of said plurality of storage blocks to said second register and for selectively transferring the contents of locations in said second register to said control unit whereby the contents of several different locations can be transferred to said control unit in response to the actuation of one of said operator keys and said transfer-out condition of said first register.

16. In a system including a memory comprised of first and second groups of storage blocks, each block including a plurality of storage locations:

means initially storing a basic subroutine in each of some of said first group storage locations;

a first register having a plurality of storage locations;

a keyboard comprised of a plurality of keys including first and second groups of keys, each key in said first group associated with a different one of said first register locations and each key in said second group associated with a different one of said second group storage blocks;

means for selectively transferring the contents of one of said first group of blocks to said first register;

means for selectively defining a transfer-in or transfer-out condition for said first register;

a control unit;

means responsive to said transfer-out condition and the actuation of one of said first group of keys for transferring the contents of said first register location associated with said actuated first group key to said control unit;

means responsive to said transfer-in condition and the actuation of one of said first group of keys and the actuation of other ones of said keys for recording information identifying the sequence of actuation of said other ones of said keys in said first register location associated with said actuated first group key;

means initially storing a mathematical function in each of said second group of storage blocks;

a first function register;

means responsive to the actuation of one of said second group of keys for transferring the contents of one of said second group of blocks to said first function register; and means responsive to said contents transferred to said control unit for performing operations identified thereby on said contents of said first function register.

17. The system of claim 16 including a second register having a plurality of storage locations; and means in said control unit responsive to the transfer of said recorded information identifying a sequence of key actuations to said control unit for selectively transferring the contents of a second of said first group of storage blocks to said second register and for selectively transferring the contents of locations in said second register to said control unit whereby the contents of several different first group locations can be transferred to said control unit in response to the acutation of one of said first group keys and said transfer-out condition of said first register.

18. In a system including computer means responsive to each of a plurality of applied operational instructions for performing specified operations with respect to applied data;

a plurality of manually actuatable devices;

first memory means;

means responsive to the actuation of certain ones of said devices for storing operational instructions in said first memory means in a selected sequence;

second memory means;

means responsive to the actuation of certain other ones of said devices for storing selected data in said second memory means; and means for applying said operational instructions stored in said first memory means and said data stored in said second memory means to said computer means.

19. A system including:

a computer operable in response to a sequence of applied instructions for performing identified operations on applied data;

a plurality of manually actuatable devices;

first memory means;

means responsive to the actuation of said devices for storing a selected sequence of instructions in said first memory means;

means for applying selected data to said computer; and means for applying said selected sequence of instructions to said computer for performing operations identified thereby on said applied data to thus develop new data.

20. The system of claim 19 including means for graphically displaying said applied and new data.

21. A multiuser system including:

a computer operable in response to a sequence of applied instructions for performing identified operations on applied data;

a plurality of user stations;

means in each of said stations for generating and applying to said computer a selected sequence of instructions;

means in each of said stations for applying selected data to said computer; and means in said computer for performing operations identified by an applied sequence of instructions from one of said stations on data applied thereto by the same station to thus develop new data.

22. The system of claim 21 including means in each of said stations for graphically displaying data.

23. A computer system comprising:

memory means storing a first plurality of different manifestations, each such manifestation defining a different lower level operation;

manually actuatable means including means for selecting in sequence a plurality of said lower level operations, each such sequence defining a higher level operation;

means responsive to said manually actuatable means for storing manifestations defining said higher level operations in said memory means;

computer means responsive to the application thereto of manifestations defining either a lower or higher level operation for executing the defined operation;

means included in said manually actuatable means for selectively identifying one of said stored manifestations; and means for applying said identified stored manifestation to said computer means.

References Cited

UNITED STATES PATENTS

| | | | |
|---|---|---|---|
| 3,047,228 | 7/1962 | Bauer et al. | 235—157 |
| 3,187,321 | 6/1965 | Kameny | 340—345 |

| | | | |
|---|---|---|---|
| 3,120,606 | 2/1964 | Eckert et al. | 235—160 |
| 3,151,404 | 10/1964 | Schott | 35—33 |

OTHER REFERENCES

Ledley, Programming and Utilizing Digital Computers, McGraw-Hill Book Co., Inc., 1962, pp. 77, 79–85, 244 and 405.

PAUL J. HENON, *Acting Primary Examiner.*

R. RICKERT, *Assistant Examiner.*